(12) United States Patent
Lee

(10) Patent No.: US 11,006,112 B2
(45) Date of Patent: *May 11, 2021

(54) PICTURE QUALITY ORIENTED RATE CONTROL FOR LOW-LATENCY STREAMING APPLICATIONS

(71) Applicant: Sony Interactive Entertainment Inc., Tokyo (JP)

(72) Inventor: Hung-Ju Lee, Pleasanton, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,488

(22) Filed: Sep. 16, 2019

(65) Prior Publication Data
US 2020/0014926 A1 Jan. 9, 2020

Related U.S. Application Data

(63) Continuation of application No. 14/529,395, filed on Oct. 31, 2014, now Pat. No. 10,419,760.

(60) Provisional application No. 62/057,112, filed on Sep. 29, 2014.

(51) Int. Cl.
 H04N 19/124 (2014.01)
 H04N 19/176 (2014.01)
 H04N 19/14 (2014.01)
 H04N 19/15 (2014.01)

(52) U.S. Cl.
 CPC ......... H04N 19/124 (2014.11); H04N 19/14 (2014.11); H04N 19/15 (2014.11); H04N 19/176 (2014.11)

(58) Field of Classification Search
 CPC ... H04N 19/124; H04N 19/172; H04N 19/176
 See application file for complete search history.

(56) References Cited

U.S. PATENT DOCUMENTS

| 5,231,484 A | 7/1993 | Gonzales et al. |
| 5,502,493 A | 3/1996 | Meyer |
| 5,650,860 A | 7/1997 | Uz |

(Continued)

FOREIGN PATENT DOCUMENTS

JP H1075451 3/1998

OTHER PUBLICATIONS

Co-Pending U.S. Appl. No. 14/529,395, to Hung Ju Lee, filed Oct. 31, 2014.

(Continued)

Primary Examiner — Mainul Hasan
(74) Attorney, Agent, or Firm — JDI Patent; Joshua Isenberg; Robert Pullman

(57) ABSTRACT

A derived quantization parameter for a section of a currently encoding picture of a plurality of pictures is incremented to produce an updated quantization parameter when the derived quantization parameter is less than a minimum quantization parameter for the currently encoding picture. The section is then encoded using the updated quantization parameter. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

17 Claims, 7 Drawing Sheets

(56) References Cited

U.S. PATENT DOCUMENTS

| | | | |
|---|---|---|---|
| 5,933,532 A | 8/1999 | Kanji Mihara | |
| 6,078,695 A | 6/2000 | Kadono | |
| 6,172,621 B1 | 1/2001 | Iwata | |
| 6,243,497 B1 | 6/2001 | Chiang et al. | |
| 6,463,101 B1 | 10/2002 | Koto | |
| 6,665,340 B1 | 12/2003 | Kimoto | |
| 6,700,932 B2 | 3/2004 | Shen et al. | |
| 6,700,935 B2 | 3/2004 | Lee | |
| 6,760,482 B1 | 7/2004 | Taubman | |
| 7,145,946 B2 | 12/2006 | Lee | |
| 7,321,621 B2 | 1/2008 | Popescu et al. | |
| 7,372,903 B1 | 5/2008 | Lee et al. | |
| 7,426,296 B2 | 9/2008 | Lee et al. | |
| 7,492,820 B2 | 2/2009 | Puri | |
| 7,554,468 B2 | 6/2009 | Xu | |
| 7,688,891 B2 | 3/2010 | Kondo et al. | |
| 7,697,608 B2 | 4/2010 | Lee | |
| 7,697,783 B2 | 4/2010 | Lee et al. | |
| 7,760,916 B2 | 7/2010 | Sato | |
| 7,848,428 B2 | 12/2010 | Chin | |
| 7,983,342 B2 | 7/2011 | Saha et al. | |
| 8,027,384 B2 | 9/2011 | Lee | |
| 8,032,520 B2 | 10/2011 | Dipper et al. | |
| 8,213,518 B1 | 7/2012 | Wang et al. | |
| 8,218,627 B2 | 7/2012 | Lee | |
| 8,218,640 B2 | 7/2012 | Wang | |
| 8,218,641 B2 | 7/2012 | Wang | |
| 8,345,750 B2 | 1/2013 | Lee | |
| 8,379,718 B2 | 2/2013 | Wang et al. | |
| 8,711,933 B2 | 4/2014 | Lee | |
| 8,737,485 B2 | 5/2014 | Zhang et al. | |
| 8,879,623 B2 | 11/2014 | Lee | |
| 8,913,664 B2 | 12/2014 | Lee | |
| 9,386,317 B2 | 7/2016 | Lee | |
| 10,419,760 B2* | 9/2019 | Lee | H04N 19/15 |
| 2003/0007559 A1* | 1/2003 | Lallet | H04N 19/192 |
| | | | 375/240.03 |
| 2003/0099294 A1 | 5/2003 | Wang et al. | |
| 2003/0156198 A1 | 8/2003 | Lee | |
| 2004/0042673 A1 | 3/2004 | Boon | |
| 2004/0086193 A1 | 5/2004 | Kameyama et al. | |
| 2004/0146212 A1 | 7/2004 | Kadono et al. | |
| 2005/0147375 A1 | 7/2005 | Kadono | |
| 2005/0169369 A1 | 8/2005 | Lee | |
| 2005/0169370 A1 | 8/2005 | Lee | |
| 2005/0180502 A1 | 8/2005 | Puri | |
| 2005/0207643 A1 | 9/2005 | Lee et al. | |
| 2005/0249279 A1 | 11/2005 | Kondo et al. | |
| 2005/0265461 A1 | 12/2005 | Raveendran | |
| 2005/0276323 A1 | 12/2005 | Martemyanov et al. | |
| 2005/0281334 A1 | 12/2005 | Walker et al. | |
| 2007/0025621 A1 | 2/2007 | Lee et al. | |
| 2007/0071094 A1* | 3/2007 | Takeda | H04N 19/115 |
| | | | 375/240.04 |
| 2007/0171975 A1 | 7/2007 | Smith et al. | |
| 2007/0274396 A1 | 11/2007 | Zhang et al. | |
| 2007/0297505 A1 | 12/2007 | Fidler et al. | |
| 2008/0025397 A1 | 1/2008 | Zhao et al. | |
| 2008/0049844 A1 | 2/2008 | Liu et al. | |
| 2008/0151998 A1 | 6/2008 | He | |
| 2008/0181311 A1 | 7/2008 | Zhang et al. | |
| 2009/0003441 A1 | 1/2009 | Sekiguchi et al. | |
| 2009/0003447 A1 | 1/2009 | Christoffersen et al. | |
| 2009/0003448 A1 | 1/2009 | Sekiguchi et al. | |
| 2010/0150227 A1 | 6/2010 | Lee | |
| 2010/0150228 A1 | 6/2010 | Lee | |
| 2011/0002381 A1* | 1/2011 | Yang | H04N 19/40 |
| | | | 375/240.03 |
| 2011/0051806 A1 | 3/2011 | Lee | |
| 2011/0051809 A1 | 3/2011 | Lee | |
| 2012/0033730 A1 | 2/2012 | Lee | |
| 2012/0076202 A1* | 3/2012 | Brailovskiy | H04N 19/61 |
| | | | 375/240.03 |
| 2013/0034149 A1 | 2/2013 | Karuchula et al. | |
| 2013/0034169 A1 | 2/2013 | Sadafale et al. | |
| 2013/0072299 A1 | 3/2013 | Lee | |
| 2013/0156103 A1 | 6/2013 | Wang et al. | |
| 2014/0161172 A1 | 6/2014 | Wang et al. | |
| 2014/0233640 A1 | 8/2014 | Lee | |
| 2015/0016513 A1 | 1/2015 | Lee | |
| 2016/0088299 A1 | 3/2016 | Lee | |
| 2016/0094846 A1 | 3/2016 | Lee | |
| 2016/0381386 A1 | 12/2016 | Krishnan et al. | |
| 2017/0034538 A1 | 2/2017 | Lee | |

OTHER PUBLICATIONS

Co-Pending U.S. Appl. No. 15/462,608, to Hung-Ju Lee, filed Mar. 17, 2017.
Co-Pending U.S. Appl. No. 62/315,564, to Hung-Ju Lee, filed Mar. 30, 2016.
Final Office Action dated Sep. 20, 2018 for U.S. Appl. No. 14/529,395.
Non-Final Office Action for U.S. Appl. No. 14/529,395, dated Feb. 2, 2018.
Non-Final Office Action for U.S. Appl. No. 14/529,395, dated Jan. 4, 2019
Non-Final Office Action for U.S. Appl. No 14/529,395, dated Nov. 30, 2016.
Notice of Allowance for U.S. Appl. No. 14/529,395, dated May 2, 2019.
U.S. Appl. No. 14/493,238, to Hung-Ju Lee, filed Sep. 22, 2014.
U.S. Appl. No. 62/057,112, to Hung-Ju Lee, filed Sep. 29, 2014.
Final Office Action for U.S. Appl. No. 16/439,543, dated Jul. 8, 2020.

* cited by examiner

PICTURE QUALITY ORIENTED RATE CONTROL FOR LOW-LATENCY STREAMING APPLICATIONS

CLAIM OF PRIORITY

This application is a continuation of U.S. patent application Ser. No. 14/529,395, filed Oct. 31, 2014, the entire contents of which are incorporated herein by reference. U.S. patent application Ser. No. 14/529,395 claims the priority benefit of commonly-assigned, U.S. Provisional Patent Application No. 62/057,112, filed Sep. 29, 2014, the entire disclosures of which are incorporated herein by reference.

FIELD OF THE DISCLOSURE

Aspects of the present disclosure are related to encoding of digital data for streaming applications. In particular, the present disclosure is related to rate control for streaming applications.

BACKGROUND

Digital signal compression (sometimes referred to as video coding or video encoding) is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; AVC (H.264), and HEVC (H.265). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Aspects of the present disclosure are directed to picture quality oriented rate control for low latency streaming applications, such as online video gaming.

Before describing picture quality oriented rate control in accordance with aspects of the present disclosure, it is useful to understand how digital pictures, e.g., video pictures are encoded for streaming applications. Furthermore, it is useful to understand how encoded streaming digital picture data is decode, since the manner in which a picture or portion of a picture is encoded affects how it is to be decoded.

Figure 1:
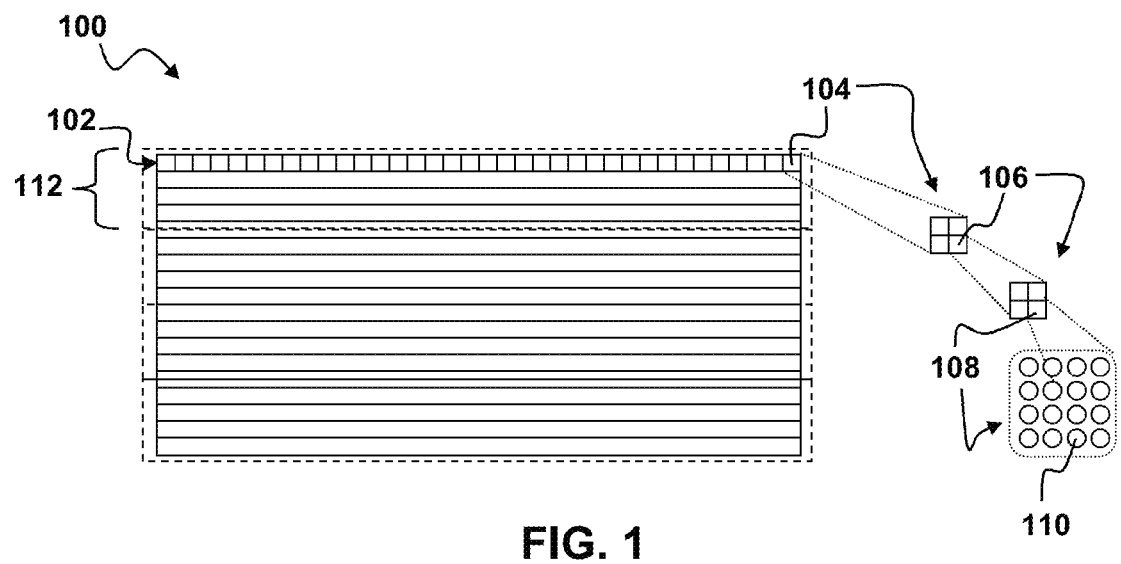
FIG. 1 is a schematic diagram illustrating one possible division of a streaming data picture within the context of aspects of the present disclosure.

By way of example, and not by way of limitation, as shown in FIG. 1, a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices (e.g., macroblock rows) 102, macroblocks 104, sub-macroblocks 106, blocks 108 and individual pixels 110. Other examples include Coding Tree Blocks (CTB) and other section types that are specific to the HEVC (H.265) coding standard. As illustrated in FIG. 1, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors or other light emitting elements used to illuminate the pixels in the display combined with the persistence of vision results in the two fields being perceived as a continuous image. For certain display devices, such as liquid crystal displays, it may be necessary to interlace the two fields into a single picture before being displayed. Streaming data representing encoded images typically includes information indicating whether the image is a field or a frame. Such information may be included in a header to the image.

Modern video coder/decoders (codecs), such as MPEG2, MPEG4 and H.264 generally encode video frames as one of three basic types known as Intra-Frames, Predictive Frames and Bipredicitve Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames. Video frames are often encoded as I-frames when a scene change is detected in the input video.

P-frames require the prior decoding of some other picture (s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). In H.264, there are two types of B-frame, a reference B-frame and non-reference B-frame. A reference B-frame can be used as a reference frame for B-frame coding and a non-reference B-frame cannot. Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

Figure 2A:
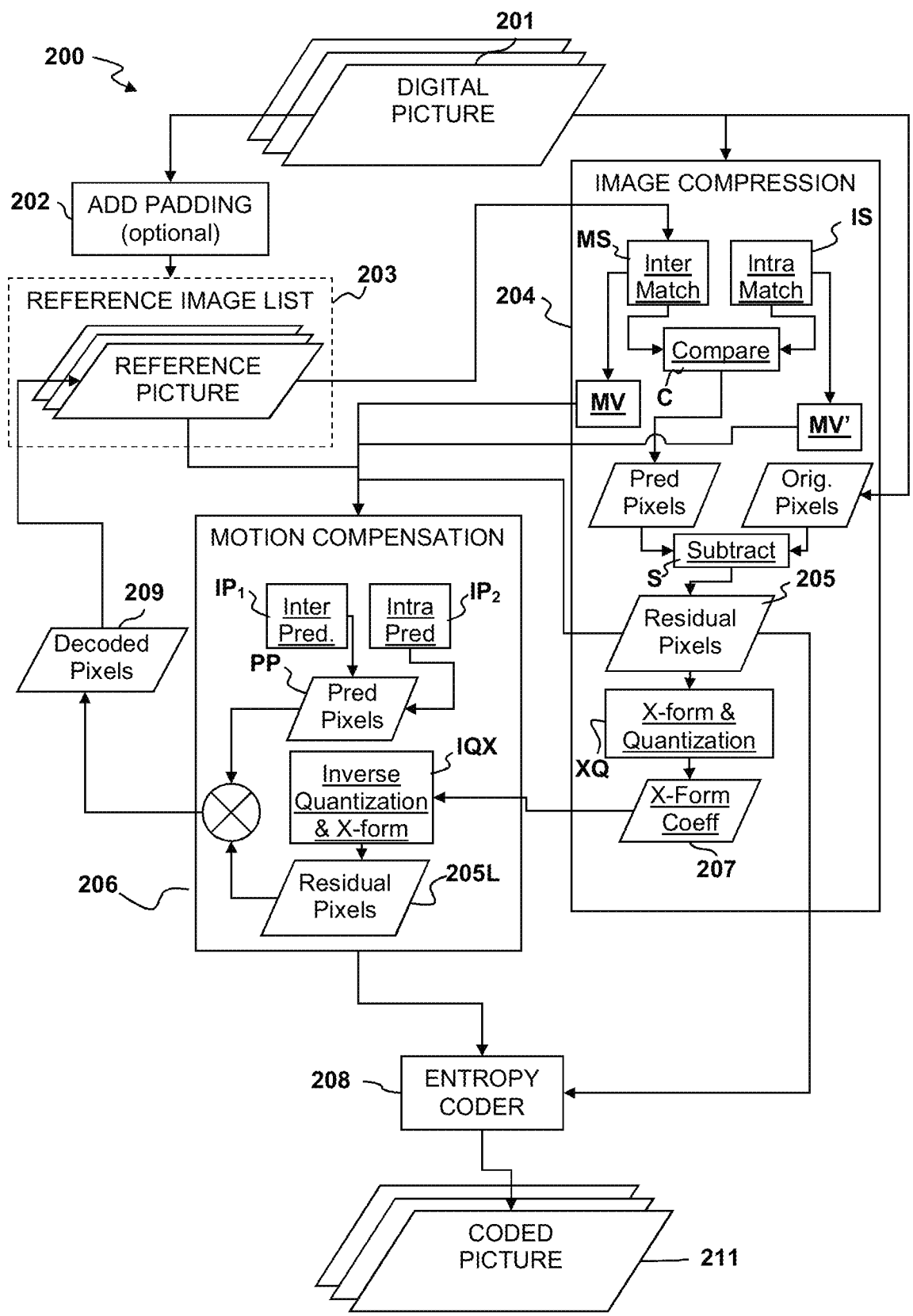
FIG. 2A is a flow diagram illustrating digital picture encoding that may be used in conjunction with aspects of the present disclosure.

By way of example, and not by way of limitation, digital pictures may be encoded according to a generalized method 200 as illustrated in FIG. 2A. The encoder receives a plurality of digital images 201 and encodes each image. Encoding of the digital picture 201 may proceed on a section-by-section basis. The encoding process for each section may optionally involve padding 202, image compression 204 and motion compensation 206. To facilitate a common process flow for both intra-coded and inter-coded pictures, all un-decoded pixels within a currently processing picture 201 may be padded with temporary pixel values to produce a padded picture, as indicated at 202. The padding may proceed, e.g., as described above in U.S. Pat. No. 8,711,933, which is incorporated herein by reference. The padded picture may be added to a list of reference pictures 203 stored in a buffer. Padding the picture at 202 facilitates the use of a currently-processing picture as a reference picture in subsequent processing during image compression 204 and motion compensation 206. Such padding is described in detail in commonly-assigned U.S. Pat. No. 8,218,641, which is incorporated herein by reference.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless.

Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, including the currently padded picture, for a good match. If the current picture (or subsection) is coded as an intra picture, (or subsection) only the padded picture is available in the reference list. The image compression at 204 produces a motion vector MV and transform coefficients 207 that are subsequently used along with one or more of the reference pictures (including the padded picture) during motion compensation at 206.

The image compression 204 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 205. The residual pixels then undergo a transform and quantization XQ to produce transform coefficients 207. The transform is typically based on a Fourier transform, such as a discrete cosine transform (DCT).

The transform outputs a set of coefficients, each of which is a weighting value for a standard basis pattern. When combined, the weighted basis patterns re-create the block of residual samples. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. For a low QP value, more non-zero coefficients remain after quantization, resulting in better decoded image quality but lower compression. Conversely, for a high QP value, fewer non-zero coefficients remain after quantization, resulting in higher image compression but lower image quality.

Figure 2B:
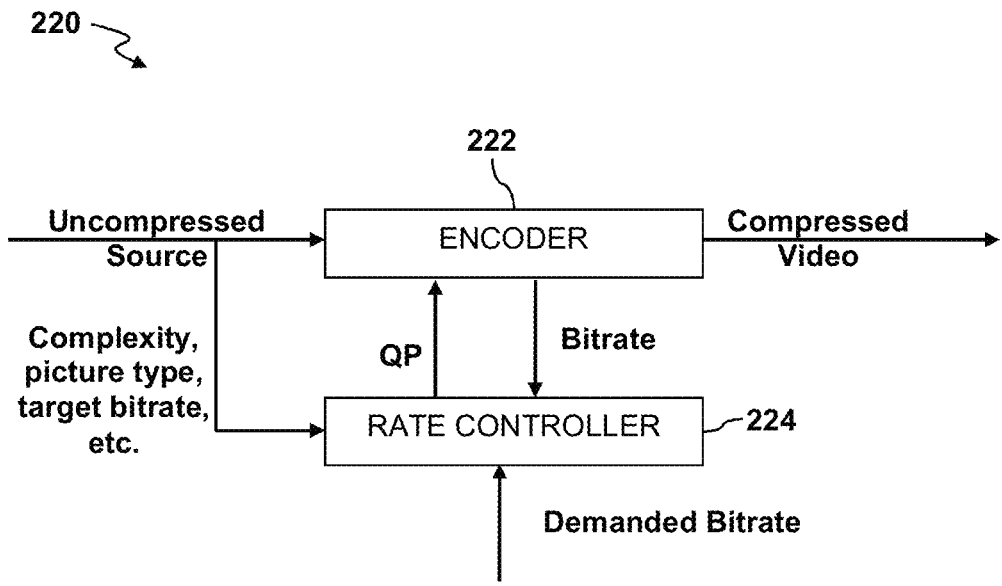
FIG. 2B is a block diagram illustrating a system having an encoder and rate controller that may be used in conjunction with aspects of the present disclosure.

Since QP controls bit usage in encoding, many encoding programs utilize a rate controller that adjusts QP in order to achieve a desired bitrate. The use of such a rate controller may be understood by referring to FIG. 2B and FIG. 2C. As seen in FIG. 2B, a video encoding system 220 may include an encoder 222 and a rate controller 224. The encoder receives uncompressed source data (e.g., an input video) and produces compressed output. The encoder 222 may be configured to implement the coding method 200 depicted in FIG. 2A. As noted above, the video coding method 200 uses a QP value that affects the bit usage for encoding a video section and therefore affects the bitrate. Generally, lower bit usage results in a higher bitrate. The rate controller 224 determines a QP value based on a demanded bitrate, which may be specified by an external application. The encoder 222 uses the QP value determined by the rate controller and determines the actual resulting bit usage and bit rate. The rate controller 224 can use the actual bit rate to adjust the QP value in a feedback loop.

Figure 2C:
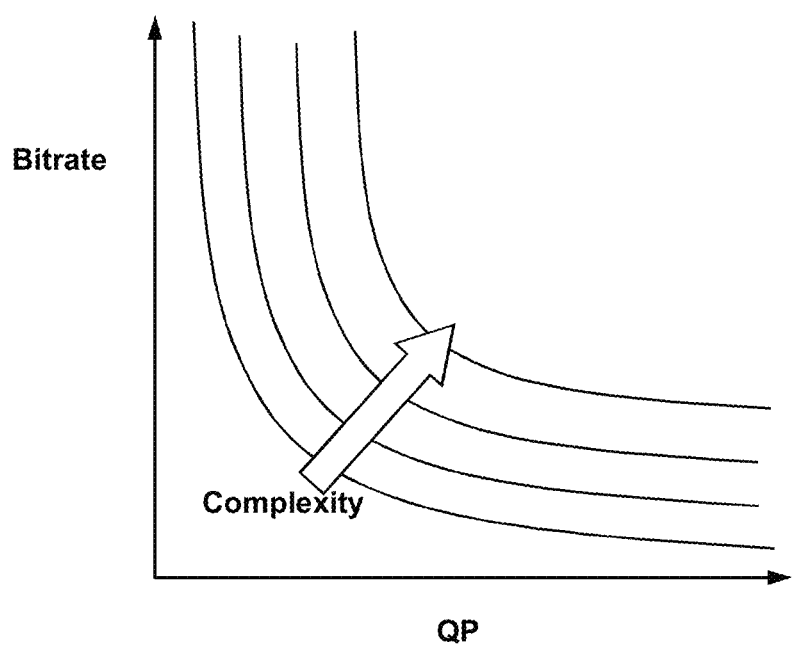
FIG. 2C is a graph illustrating a general relationship between bitrate, quantization parameter (QP) and complexity in a rate control algorithm that may be used in conjunction with aspects of the present disclosure.

A relationship between the bitrate and the value of the QP depends partly on the complexity of the image being encoded, as shown in FIG. 2C. The bitrate versus QP relationship can be expressed in terms of a set of curves with different curves for different levels of complexity. The heart of the algorithm implemented by the rate controller is a quantitative model describing a relationship between QP, actual bitrate and some measure of complexity, e.g., as depicted in FIG. 2C. The relevant bitrate and complexity are generally associated only with the differences between source pixels and predicted pixels (often referred to as residuals) because the quantization parameter QP can only influence the detail of information carried in the transformed residuals.

Complexity generally refers to amount of spatial variation within a picture or part of the picture. On a local level, e.g., block or macroblock level, the spatial variation may be measured by the variance of the pixel values within the relevant section. However, for a video sequence, complexity may also relate to the temporal variation of a scene of a sequence of images. For example, a video sequence consists of one object having substantial spatial variation that translates slowly across the field of view, may not require very many bits because temporal prediction can easily capture the motion using a single reference picture and a series of motion vectors. Although it is difficult to define an inclusive video complexity metric that is also easy to calculate, the Mean Average Difference (MAD) of the prediction error (difference between source pixel value and predicted pixel value) is often used for this purpose.

It is noted that the quantization parameter QP may be determined from multiple factors including, but not limited to the picture type of the source picture, a complexity of the source picture, an estimated target number of bits and an underlying rate distortion model. For example, QP may be determined on a section-by-section basis using a variation for a section of the currently encoding picture, e.g., a section (e.g., MB) variance. Alternatively, QP for a currently encoding section may be determined using an actual bit count for encoding a co-located section (e.g., MB) in a previous frame. Examples of such QP level calculations are described, e.g., in commonly assigned U.S. Patent Application Publication No. 2011/0051806, to Hung-Ju Lee, which is incorporated herein by reference.

Motion search and prediction depend on the type of picture being encoded. Referring again to FIG. 2A, if an intra picture is to be coded, the motion search MS and inter/intra comparison C are turned off. However, in embodiments of the present invention, since the padded picture is available as a reference, these functions are not turned off. Consequently, the image compression 204 is the same for intra-coded pictures and inter-coded pictures.

The motion search MS may generate a motion vector MV by searching the picture 201 for a best matching block or macroblock for motion compensation as is normally done for an inter-coded picture. If the current picture 201 is an intra-coded picture, by contrast, existing codecs typically do not allow prediction across pictures. Instead all motion compensation is normally turned off for an intra picture (e.g., I-frame) and the picture coded by generating transform coefficients and performing pixel prediction. In some implementations, however, an intra picture may be used to do inter prediction by matching a section in the current picture to another offset section within that same picture. The offset between the two sections may be coded as a motion vector MV' that can be used that for motion compensation at 206. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do motion compensation at 206. However, these functions are conventionally turned off for encoding of intra pictures. In embodiments of the present invention, the codec may be instructed not to turn off such "inter" picture functions for encoding of intra pictures.

As used herein, motion compensation refers to a technique for describing a picture in terms of the transformation of a reference image to a currently processing image. In general, the motion compensation 206 acts as a local decoder within the encoder implementing the encoding process 200. Specifically, the motion compensation 206 includes inter prediction IP1 and (optionally) intra prediction IP2 to get predicted pixels PP using the motion vector MV or MV' from the image compression 204 and reference pixels from a picture in the reference list. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201. After the decoded pixels have been inserted, un-decoded pixels in the reference picture may undergo padding 202.

In a conventional encoder, if the current picture is intra coded, the inter-prediction portions of motion compensation 206 are turned off because there are no other pictures that can be used for motion compensation. However, in embodiments of the present invention, by contrast, motion compensation may be performed on any picture 201 independent of whether a particular picture is to be inter-coded or intra-coded. In embodiments of the present invention, the encoder implementing the method 200 may be modified to add the padded picture to the reference picture list 203 and the inter-prediction portions of the motion compensation 206 are not turned off, even if the currently processing image is to be intra coded. As a result, the process flow for both inter coded sections and intra coded sections is the same during motion compensation 206. The only major difference is the selection of the reference picture to be used for encoding.

By way of example, and not by way of limitation, in one type of motion compensation, known as block motion compensation (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to a global motion compensation capable of panning. Further down the encoding pipeline, the method 200 may optionally use entropy coding 208 to take advantage of the resulting statistical distribution of the motion vectors around the zero vector to reduce the output size.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block motion compensation divides up a currently encoding image into non-overlapping blocks, and computes a motion compensation vector that indicates where those blocks come from in a reference image. The reference blocks typically overlap in the source frame. Some video compression algorithms assemble the current image out of pieces of several different reference images in the reference image list 203.

The result of the image compression 204 and motion compensation 206 and (optionally) entropy coding 208 is a set of data 211 referred to for convenience as a coded picture. The motion vector MV, (and/or intra prediction mode motion vector MV') and transform coefficients 207 may be included in the coded picture 211. Once a digital picture or other form of streaming data has been encoded, the encoded data may be transmitted and then decoded.

Figure 3:
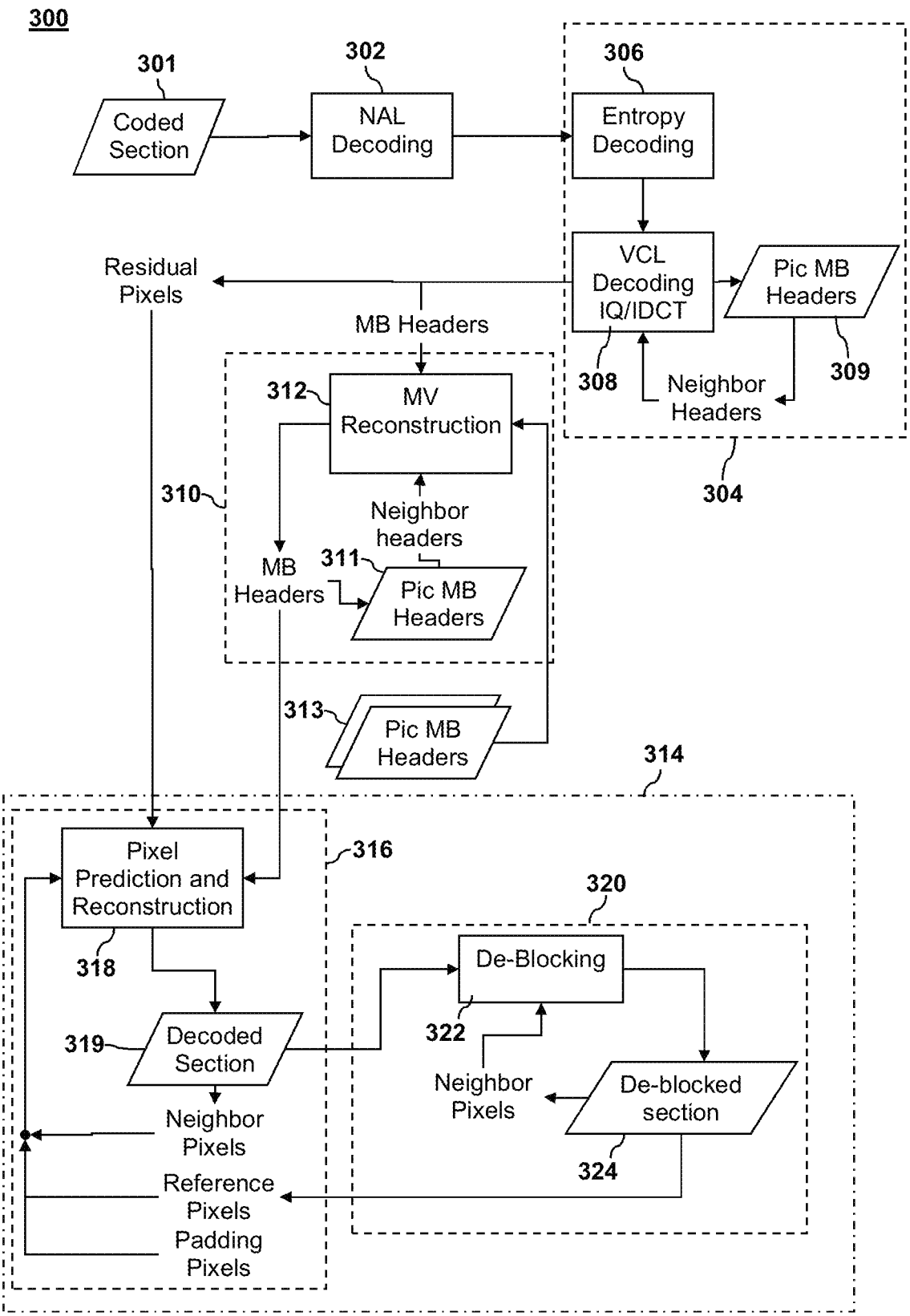
FIG. 3 is a flow diagram illustrating an example of a possible process flow in streaming data decoding that may be used in conjunction with aspects of the present disclosure.

FIG. 3 illustrates an example of a possible process flow in a method 300 for decoding of streaming data 301 that may be used in conjunction with aspects of the present disclosure. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. The Network Abstraction Layer (NAL) is a part of streaming data standards, such as the H.264/AVC and HEVC video coding standards. The main goal of the NAL is the provision of a "network-friendly" representation of streaming data for "conversational" (e.g., video telephony) and "non-conversational" (storage, broadcast, or streaming) applications. NAL decoding may remove from the data 301 information added to assist in transmitting the data. Such information, referred to as a "network wrapper" may identify the data 201 as video data or indicate a beginning or end of a bitstream, bits for alignment of data, and/or metadata about the video data itself.

In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized. The example illustrated in FIG. 3 is described in terms of macroblocks and the AVC (H.265) standard. However, these are not limiting features of aspects of the present disclosure. For example, in the latest H265 (HEVC) standard, there is no macroblock concept. Instead, more flexible Coding Unit (CU), Prediction Unit, (PU), Transform Unit (TU) concepts are introduced. Aspects of the present disclosure may be operate in conjunction with such coding standards.

Figure 4:
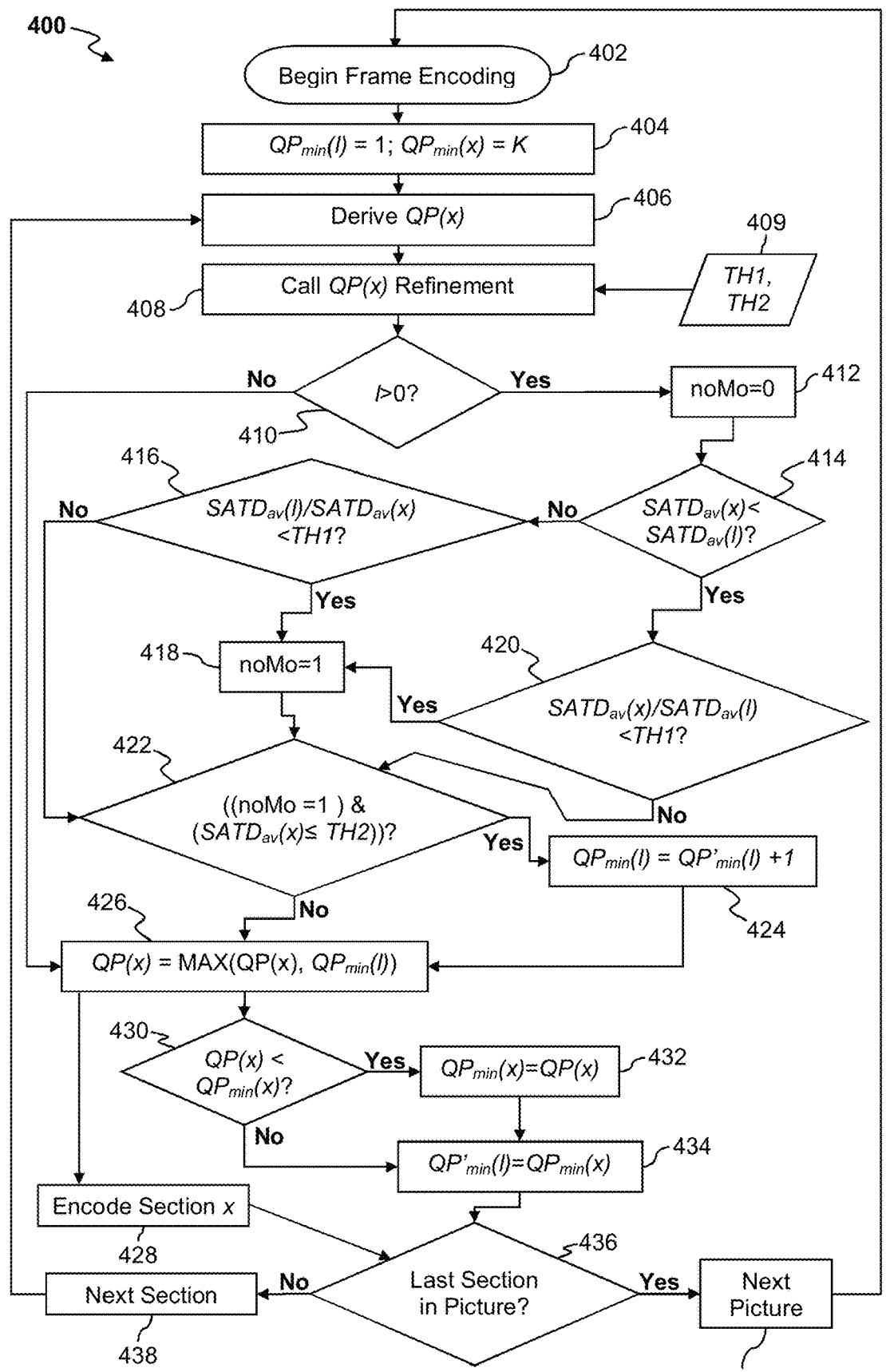
FIG. 4 is a flow diagram illustrating picture quality oriented rate control adjustment according to aspects of the present disclosure.

In some embodiments, after NAL decoding at 302, the remaining decoding illustrated in FIG. 4 may be implemented in three different thread groups or task groups referred to herein as video coded layer (VCL) decoding 304, motion vector (MV) reconstruction 310 and picture reconstruction 314. The picture reconstruction task group 214 may include pixel prediction and reconstruction 316 and post processing 320. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)—coded data streams can be computationally intensive and may present challenges for devices that decode AVC (H.264)—coded bitstreams using general purpose microprocessors. For this reason, many systems use a hardware decoder accelerator.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 210 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may optionally be used for pixel prediction within that same current picture as described above, independent of whether the picture (or subsections thereof) is inter-coded or intra-coded. De-blocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer. The post processing is done at display time and the post processing output may not share the same buffer as the decoder output picture buffer.

Picture Quality Oriented Rate Control Method

Aspects of the present disclosure address two issues found in traditional rate control used in low latency streaming applications in which the encoded frame size is capped by a limited or non VBV buffer to reduce network jitter. As is generally known to those skilled in the art VBV refers to Video Buffer Verifier, a theoretical buffer model used to ensure that an encoded video stream can be correctly buffered, and played back at the decoder device. A larger VBV buffer size usually improves quality in high action sequences, but tends to cause higher bitrate spikes.

The first issue is that a top priority of traditional rate control VBV buffering mechanism is meeting the target bitcount. This sometimes results in too many bits being used to encode static scenes or scenes with little motion, which results in use of a large number of bits to encode the scene without significant visual quality improvement. The second issue is that scenes with little or no motion tend to have a large number of intra-coded sections. Too many intra-coded sections in a frame causes a false detection of a scene change, which causes the entire frame to encoded as an I-frame. Aspects of the present disclosure address the above two issues by selectively limiting the quality associated with sections of a frame for a static or low-motion scene. Aspects of the present disclosure can achieve significant savings in the number of bits used to encode pictures while maintaining sufficiently good quality.

FIG. 4 illustrates an algorithm 400 for implementing a method for picture quality oriented rate control in the context of streaming digital picture encoding. Certain abbreviations, notations and acronyms are used in the discussion of FIG. 4 below. As used herein, the following abbreviations and acronyms have the following meanings:

Coding unit: a portion of larger set of unencoded streaming data that is to be encoded. In the context of encoding of streaming picture data (e.g., streaming video) the coding units are sometimes referred to herein as sections.

Line: a row of sections (e.g., macroblocks, sub-macroblocks, blocks, pixels) is denoted a line Line index l is the index to a line in a picture and is set to the current section number x divided by the picture width in sections.

SATD: Sum of Absolute Transformed Differences (SATD) is a widely used video quality metric used for block-matching in motion estimation for video compression. It works by taking a frequency transform, usually a Hadamard transform, of the differences between the pixels in the original block and the corresponding pixels in the block being used for comparison. The transform itself is often of a small block rather than the entire macroblock. For example, in the x264 coding standard, a series of 4×4 blocks are transformed rather than doing a more processor-intensive 16×16 transform. Alternatives to the Hadamard transform (also known as the Walsh function) include the Discrete-time Fourier transform (DTFT), the discrete Fourier transform (DFT), the discretized short time Fourier transform (STFT), the discrete sine transform (DST), the discrete cosine transform (DCT), regressive discrete Fourier series, in which the period is determined by the data rather than fixed in advance, discrete chebyshev transforms, generalized DFT (GDFT), Z-transform (a generalization of the DTFT), the Modified discrete cosine transform (MDCT), and the Discrete Hartley transform (DHT).

$SATD_{av}(l)$: average SATD calculated from the 1st line to the current line indexed by l in the previous predictive frame (e.g., P frame)

$SATD_{av}(x)$: average SATD calculated from the 1st section to the current section x in the current predictive frame.

SATD variation: either $SATD_{av}(l)/SATD_{av}(x)$ or $SATD_{av}(x)/SATD_{av}(l)$, depending on whether $SATD_{av}(x)$ is less than $SATD_{av}(l)$.

$QP(x)$: quantization parameter for a section x of a currently encoding picture (e.g., a predictive frame).

$QP_{min}(l)$: minimum QP from the 1st line up to the current line indexed by l in the previous predictive frame.

$QP'_{min}(x)$: minimum QP up to the current line in the current predictive frame.

$QP_{min}(x)$: the minimum QP up to the current section in the current predictive frame.

W: The width of a frame expressed as a number of sections.

TH1: a threshold to control SATD variation.

TH2: a threshold to control SATD.

The proposed algorithm 400 illustrated in FIG. 4 can be used to determine if further refinement of QP(x) is needed. Note that the process is performed for P-frames only.

As shown in FIG. 4, encoding for a frame begins as indicated at 402. The values of $QP_{min}(l)$ and $QP_{min}(x)$ may be initialized, as indicated at 404. By way of example, and not by way of limitation, the value of $QP_{min}(l)$ may be initialized to 1 and the value of $QP_{min}(x)$ may be initialized to some number K that is greater than the maximum QP value permitted by the coding standard. For example, for the H.264 coding standard QP(x) ranges from 0 to 51 and K would therefore be greater than 51.

The implementation in the example illustrated in FIG. 4 uses SATD as a video quality metric. However, aspects of the present disclosure are not limited to such implementations. One advantage of using SATD is that it adds almost no overhead since it is available in this context. In alternative implementations, other video quality variance metrics may be used. For example, section variance between the currently encoding picture and the previously encoded picture may be used. In practice, using section variance (e.g., macroblock variance) might produce a better result than using SATD, but at a cost of additional overhead for its intensive computations.

By way of example, and not by way of limitation, the section variance may be defined as the sum of the squares of the of the differences between each pixel value Pixel(i,j) in a section and the mean pixel value for the section divided by the number of pixels N in the section. For a section of (m+1)×(n+1)=N pixels, this may be expressed mathematically as:

$$VAR = \sum_{i=0}^{i=m} \sum_{j=0}^{j=n} (Pixel(i,j)) - MEAN)^2 / N,$$

where MEAN is given by:

$$MEAN = \sum_{i=0}^{i=m} \sum_{j=0}^{j=n} (Pixel(i,j))/N.$$

By way of numerical example, if the section is a 16×16 pixel macroblock, m=n=15 and N=256.

The concept may be generalized to sections of arbitrary size.

Similar to the case with SATD as a video quality metric, the section variation may be a ratio of a first section variance to a second section variance. The first section variance may be an average variance calculated in a previous predicted picture from a first line to a current line containing the current section and the second average section variance may be an average variance calculated from the first section of the currently encoding picture to the current section of the currently encoding picture.

The quantization parameter QP(x) is then derived for the section x in the normal manner, as indicated at 406, e.g., using a rate control algorithm suitable for use with the coding standard, as discussed above with respect to FIG. 2B and FIG. 2C. A QP refinement routine may then be called, as indicated at 408. The QP refinement routine uses parameters 409, such as TH1 and TH2. In the QP refinement routine, if, at 410, the current section x is at the beginning of a line, QP(x) is updated by setting it equal to the maximum of QP(x) and $QP_{min}(l)$, as indicated at 426. If the current section x is not at the beginning of a line and the SATD variation is less than TH1 and $SATD_{av}(x)$ is less than or equal to TH2 at 422, $QP_{min}(l)$ is set equal to $QP'_{min}(l)+1$ as indicated at 424 before QP(x) is updated at 426.

There are a number of ways to determine whether the variance (e.g., SATD variation) is less than TH1. By way of example, and not by way of limitation, in FIG. 4, if the current section x is not the first section in a line a flag (noMo) may be set equal to zero, as indicated at 412. If, at 414, $SATD_{av}(x)$ is less than $SATD_{av}(l)$, the ratio $SATD_{av}(x)/SATD_{av}(l)$ is compared to TH1 at 420 otherwise, the inverse ratio $SATD_{av}(l)/SATD_{av}(x)$ is compared to TH1 at 416. If either ratio $SATD_{av}(x)/SATD_{av}(l)$ or $SATD_{av}(l)/SATD_{av}(x)$ is less than TH1 the noMo flag is reset to 1 at 418, which indicates at 422 that the SATD variation is less than TH1.

The values of TH1 and TH2 can be determined empirically. For example, if experimental results show that a variation (e.g., SATD variation) of 30% or less corresponds to known cases of no motion, then the algorithm 400 may use a value of 30% for TH1. By way of example, and not by way of limitation, TH2 may be calculated from the target number of bits per frame. One possible formula for TH2 has the form $TH2=A \cdot (NBF_t/B)-C$, where $NBF_t$ is the target number of bits per frame and A, B, and C are constants determined empirically. In some implementations, the formula may further restrict TH2 to lie between upper and lower limits $TH2_{min}$ and $TH2_{min}$. If the formula produces a value below $TH1_{min}$, $TH1=TH1_{min}$. Likewise, if the formula produces a value above $TH1_{max}$, $TH1=TH1_{max}$.

By way of non-limiting numerical example, TH2 may be calculated using:

$TH2=3 \cdot (NB_f/100)-125$ and limited to a range of [250,500]

Once QP(x) has been updated at 426 the current section x can be encoded using the value of QP(x). As discussed above, a larger QP value reduces the bit usage to encode a section. Therefore, incrementing QP(x) at 426 tends to reduce the bit usage for encoding section x at 428. If, at 430, QP(x) is less than $QP_{min}(x)$, the value of $QP_{min}(x)$ may be adjusted to the current value of QP(x), as indicated at 432. Furthermore, the value of $QP'_{min}(l)$ may be set equal to the value of $QP_{min}(x)$, as indicated at 434. The value of $QP'_{min}(l)$ may be stored in a table and the value may be updated as the method 400 proceeds.

The process described above may be repeated for each section in the picture, as indicated at 436 and 438 until the last section at which encoding of the next picture may be triggered at 440 and the process may begin again with the first section of the next picture.

By way of example and not by way of limitation, each section may be a macroblock (MB) and the method depicted in FIG. 4 may be implemented according to the pseudo-code below in which:

MBline is a row of macroblocks, also sometimes denoted as a macroblock line.

MB_line index is the index to a MBline in a frame, and is set to the current MB number divided by the frame width in macroblocks, e.g., 0≤MBline_index≤33 for 960×540p video;

avg_SATD_mblines[MBline_index] is the average SATD calculated from the 1st MBline to the current MBline indexed by MBline_index in the previous predictive frame (e.g., P frame);

SATD_per_mbline is the average SATD calculated from the 1st MB to the current MB in the current predictive frame;

min_qp_mblines [MBline_index] is the minimum QP from the 1st MBline up to the current MBline indexed by MBline_index in the previous predictive frame;

mb_minqp_mbline is the minimum QP up to the current MBline in the current predictive frame; and mb_minqp is the minimum QP up to the current MB in the current predictive frame.

mquant is the QP for a macroblock x.

Assuming mquant is derived by a rate controller, e.g., as described above with respect to FIG. 2B and FIG. 2C, the proposed algorithm will determine if the further refinement of mquant is needed. Note that the process is performed for P frame only. The pseudo code of the algorithm is shown below and MB_QP_refinement is called for every MB.

```
/* min_qp_mbline is initially set to be 1 at the beginning of encoding a frame */
/* mb_minqp is initially set to be K, and K > 51 at the beginning of encoding a frame */
/* mquant is QP for a macroblock x, and is derived by VCE rate control */
/* TH1 is a threshold to control SATD variation. In our case, TH1=1.3 */
/* TH2 is a threshold to control SATD, in our case, TH2=400 */
MB_QP_refinement ( ) {
        mbline_index = current_mb_num / frame_width_in_mbs;
        // check if a beginning of a MB line
        if (mbline_index > 0) {
            noMotion = 0;
            // check SATD variation between current and previous pictures
            if (SATD_per_mbline > avg_SATD_mblines [mbline_index]) {
                if (SATD_per_mbline / avg_SATD_mblines [mbline_index]) < TH1
                    noMotion = 1;
            }
            else {
                if (avg_SATD_mblines[mbline_index]/SATD_per_mbline ) < TH1
                    noMotion = 1;
            }
            // check SATD absolute value, and update min_qp_mbline
            if ((noMotion ==1 ) && (SATD_per_mbline ≤ TH2))
                    min_qp_mbline = min_qp_mblines [mbline_index] +1;
        //refine mquant if mquant < min_qp_mbline
        mquant = MAX(mquant, min_qp_mbline);
        // update mb_minqp
        if (mquant < mb_minqp)
                mb_minqp = mquant;
        // update min_qp_mblines
        min_qp_mblines [mbline_index] = mb_minqp;
}.
```

Figure 5:
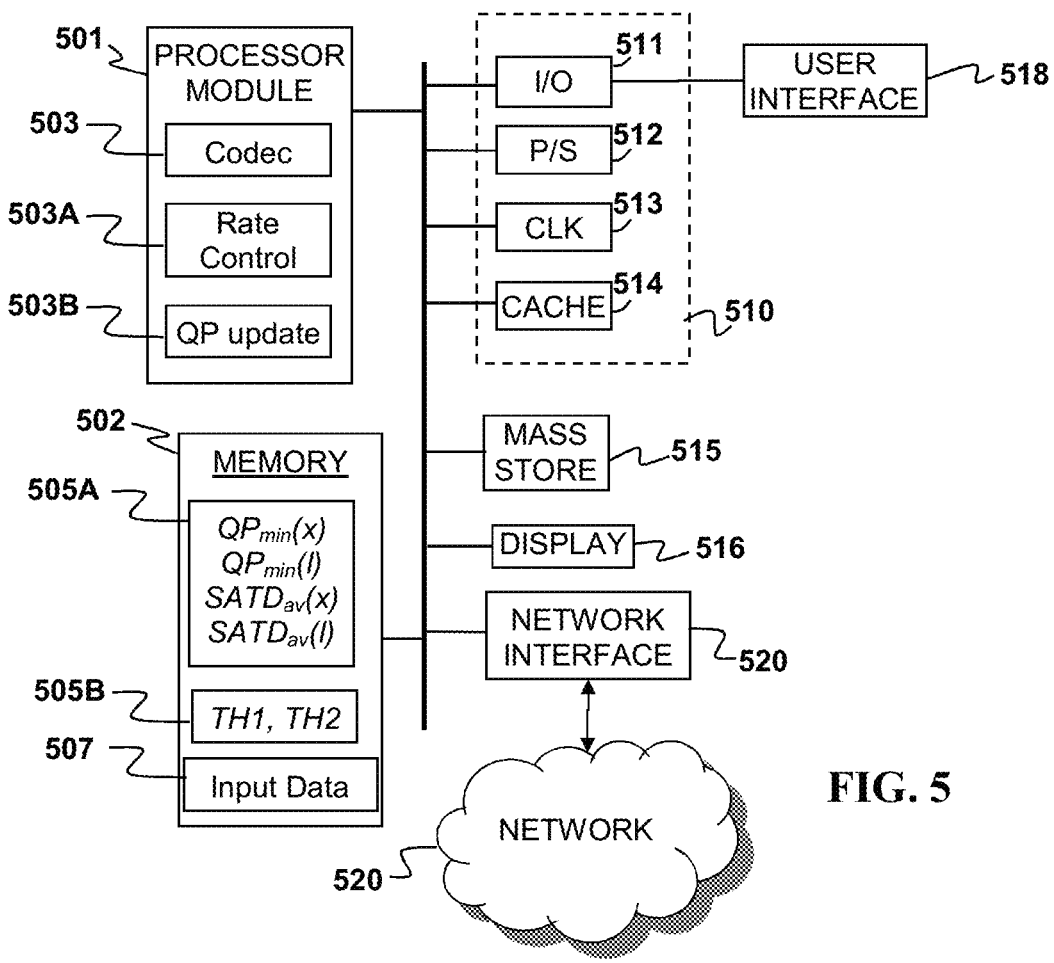
FIG. 5 is a block diagram illustrating an apparatus for encoding and/or decoding a digital picture configured to implement picture quality oriented rate control adjustment according to aspects of the present disclosure.

Aspects of the present disclosure include systems configured to implement quantization parameter (QP) updating for picture quality oriented rate control in conjunction with encoding of digital pictures, as described above. By way of example, and not by way of limitation, FIG. 5 illustrates a block diagram of a computer system 500 that may be used to implement aspects of the present disclosure. The system 500 generally may include a processor module 501 and a memory 502. The processor module 501 may include one or more processor cores, e.g., in single core, dual core, quad core, processor-coprocessor, CPU-GPU, or Cell processor architectures.

The memory 502 may be in the form of an integrated circuit, e.g., RAM, DRAM, ROM, and the like. The memory may also be a main memory that is accessible by all of the processor cores in the processor module 501. In some embodiments, the processor module 501 may have local memories associated with one or more processor cores or one or more co-processors. A codec program 503 may be stored in the main memory 502 in the form of processor readable instructions that can be executed on the processor module 501. The codec 503 may be configured to encode digital pictures. By way of example, and not by way of limitation, the codec 503 may be configured to encode digital pictures or sections of digital pictures as discussed above with respect to FIG. 2A. The codec 503 may also be configured to decode encoded digital pictures, e.g., as described above with respect to FIG. 3. A rate control program 503A may implement rate control by deriving QP, as described with respect to FIGS. 2B-2C. A QP updater 503B may adjust QP to implement picture quality oriented rate control, as described above with respect to FIG. 4. The codec 503 and Rate Controller 503A and QP updater 503B may be written in any suitable processor readable language, e.g., C, C++, JAVA, Assembly, MATLAB, FORTRAN and a number of other languages.

Input or output data 507 may be stored in memory 502. During execution of the codec 503, rate controller 503A, and/or QP updater 503B, portions of program code, parameters 505A, 505B and/or data 507 may be loaded into the memory 502 or the local stores of processor cores for processing by the processor 501. By way of example, and not by way of limitation, the input data 507 may include video pictures, or sections thereof, before encoding or decoding or at intermediate stages of encoding or decoding. In the case of encoding, the data 507 may include buffered portions of streaming data, e.g., unencoded video pictures or portions thereof. In the case of decoding, the data 507 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 502. The parameters 505A, 505B include adjustable parameters 505A, such as $QP_{min}(x)$, $QP_{min}(SATD_{av}(x))$, and $SATD_{av}(I)$ that are re-calculated during the course of encoding, rate control, or QP updating. The parameters also include fixed parameters 505B, such as TH1, TH2 that remain fixed during the encoding of a picture or over the course of encoding multiple pictures.

The system 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data. The device 800 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen, or other device that may be used in conjunction with a graphical user interface (GUI). The apparatus 500 may also include a network interface 520 to enable the device to communicate with other devices over a network 522, such as the interne. These components may be implemented in hardware, software, or firmware, or some combination of two or more of these.

By way of example, and not by way of limitation, the system 500 may transmit encoded or unencoded streaming data to other devices connected to the network 522 or receive encoded or unencoded streaming date from such devices via the network interface 520. In a particular implementation, encoded streaming data in the form of one or more encoded sections of a digital picture and/or one or more frames of encoded video may be transmitted from the system over the network 522. To implement transmitting or receiving streaming data, the processor module may execute instructions implementing a network protocol stack.

By way of example, and not by way of limitation, digital pictures may be generated with a digital camera, which may be part of the user interface 518 or which may be a separate peripheral coupled to the system 500, e.g., via the I/O elements 511. According to some aspects, the digital pictures may be generated by a software application executed by the processor module 501.

Figure 6:
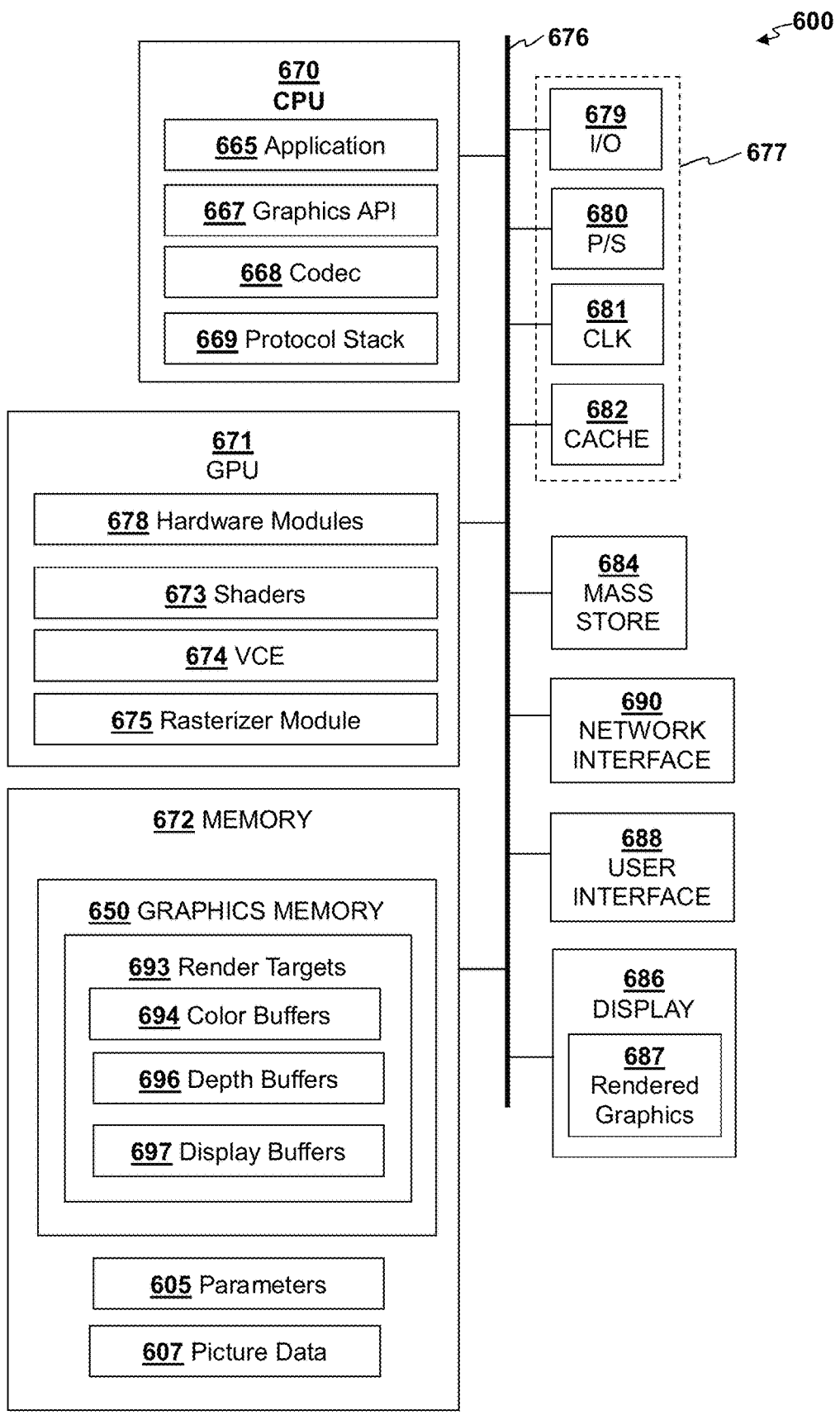
FIG. 6 is a schematic diagram depicting a graphics rendering system according to aspects of the present disclosure.

FIG. 6 illustrates an example of a computing system 600 that is configured to generate, encode, and transmit digital pictures in accordance with aspects of the present disclosure. The system 600 may be configured to render graphics for an application 665 with in accordance with aspects described above. According to aspects of the present disclosure, the system 600 may be an embedded system, mobile phone, personal computer, tablet computer, portable game device, workstation, game console, and the like.

The system 600 may generally include a processor module and a memory configured to implemented aspects of the present disclosure, e.g., by generating digital pictures, encoding the digital pictures by performing a method having features in common with the method of FIG. 4, and transmitting the encoded pictures over a network. In the illustrated example, the processor module may include a central processing unit (CPU) 670, a graphics processing unit (GPU) 671, and a memory 672. The memory 672 may optionally include a main memory unit that is accessible to both the CPU and GPU, and portions of the main memory may optionally include portions of the graphics memory 650. The CPU 670 and GPU 671 may each include one or more processor cores, e.g., a single core, two cores, four cores, eight cores, or more. The CPU 670 and GPU 671 may be configured to access one or more memory units using a data bus 676, and, in some implementations, it may be useful for the system 600 to include two or more different buses.

The memory 672 may include one or more memory units in the form of integrated circuits that provides addressable memory, e.g., RAM, DRAM, and the like. The graphics memory 650 may temporarily store graphics resources, graphics buffers, and other graphics data for a graphics rendering pipeline. The graphics buffers may include, e.g., one or more vertex buffers for storing vertex parameter values and one or more index buffers for storing vertex indices. The graphics buffers may also include a one or more render targets 693, which may include both color buffers 694 and depth buffers 696 holding pixel/sample values computed as a result of execution of instructions by the CPU 670 and GPU 671. In certain implementations, the color buffers 694 and/or depth buffers 696 may be used to determine a final array of display pixel color values to be stored in a display buffer 697, which may make up a final rendered image intended for presentation on a display. In certain implementations, the display buffer may include a front buffer and one or more back buffers, and the GPU 671 may be configured to scanout graphics frames from the front buffer of the display buffer 697 for presentation on a display 686.

The CPU may be configured to execute CPU code, which may include an application 665 that utilizes rendered graphics (such as a video game) and a corresponding graphics API 667 for issuing draw commands or draw calls to programs implemented by the GPU 671 based on the state of the application 665. The CPU code may also implement physics simulations and other functions.

To support the rendering of graphics, the GPU may execute shaders 673, which may include vertex shaders and pixel shaders. The GPU may also execute other shader programs, such as, e.g., geometry shaders, tessellation shaders, compute shaders, and the like. In some implementations, the GPU may include a Video Coding Engine (VCE) 674 configured to implement video encoding and decoding tasks including, but not limited to, encoding digital pictures or sections of digital pictures as discussed above with respect to FIG. 2A, implementing rate control by deriving QP, as described with respect to FIGS. 2B-2C, and adjusting QP to implement picture quality oriented rate control, as described above with respect to FIG. 4. The GPU may also include specialized hardware modules 678, which may include one or more texture mapping units and/or other hardware modules configured to implement operations at one or more stages of a graphics pipeline, which may be fixed function operations. The shaders 673 and hardware modules 678 may interface with data in the memory 650 and the buffers 693 at various stages in the pipeline before the final pixel values are output to a display. The GPU may include a rasterizer module 675, which may be optionally embodied in a hardware module 678 of the GPU, a shader 673, or a combination thereof. The rasterization module 675 may be configured take multiple samples of primitives for screen space pixels and invoke one or more pixel shaders according to the nature of the samples, in accordance with aspects of the present disclosure.

The system 600 may also include well-known support functions 677, which may communicate with other components of the system, e.g., via the bus 676. Such support functions may include, but are not limited to, input/output (I/O) elements 679, power supplies (P/S) 680, a clock (CLK) 681, and a cache 682. The apparatus 600 may optionally include a mass storage device 684 such as a disk drive, CD-ROM drive, flash memory, tape drive, Blu-ray drive, or the like to store programs and/or data. The device 600 may also include a display unit 686 to present rendered graphics 687 to a user and user interface unit 688 to facilitate interaction between the apparatus 600 and a user. The display unit 686 may be in the form of a flat panel display, cathode ray tube (CRT) screen, touch screen, head mounted display (HMD) or other device that can display text, numerals, graphical symbols, or images. The display 686 may display rendered graphics 687 processed in accordance with various techniques described herein. The user interface 688 may one or more peripherals, such as a keyboard, mouse, joystick, light pen, game controller, touch screen, and/or other device that may be used in conjunction with a graphical user interface (GUI). In certain implementations, the state of the application 660 and the underlying content of the graphics may be determined at least in part by user input through the user interface 688, e.g., in video gaming implementations where the application 665 includes a video game.

The system 600 may also include a network interface 690 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these. In some implementations, the CPU code may optionally include a codec 668 configured to encode digital pictures generated by the GPU. By way of example, and not by way of limitation, the codec 668 may be configured to encode digital pictures or sections of digital pictures as discussed above with respect to FIG. 2A, implement rate control by deriving QP, as described with respect to FIGS. 2B-2C, and adjust QP to implement picture quality oriented rate control, as described above with respect to FIG. 4. The codec 668 or VCE 676 may also be configured to decode encoded digital pictures, e.g., as described above with respect to FIG. 3. The CPU code may also include a network protocol stack 669 configured to allow the system 600 to transmit the resulting encoded pictures or encoded sections over the network via the network interface 690.

The memory 672 may store parameters 605 and/or picture data 607 or other data. During execution of programs, such as the application 665, graphics API 667, or codec 668, portions of program code, parameters 605 and/or data 607 may be loaded into the memory 672 or cache 682 for processing by the CPU 670 and/or GPU 671. By way of example, and not by way of limitation, the picture data 607 may include data corresponding video pictures, or sections thereof, before encoding or decoding or at intermediate stages of encoding or decoding. In the case of encoding, the picture data 607 may include buffered portions of streaming data, e.g., unencoded video pictures or portions thereof. In the case of decoding, the data 607 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output buffer, which may be implemented in the memory 672. The parameters 605 may include adjustable parameters and/or fixed parameters, as discussed above.

Programs implemented by the CPU and/or GPU (e.g., CPU code, GPU code, application 665, graphics API 667, codec 668, protocol stack 669, and shaders 673) may be stored as executable or compilable instructions in a non-transitory computer readable medium, e.g., a volatile memory, (e.g., RAM) such as the memory 672, the graphics memory 650, or a non-volatile storage device (e.g., ROM, CD-ROM, disk drive, flash memory).

Aspects of the present disclosure provide for reduced bit usage and therefore better usage of available bandwidth in streaming data applications, such as streaming video. Aspects of the present disclosure may be incorporated into systems that produce digital pictures, encode them for transmission over a network, and transmit them over the network.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
   determining a derived quantization parameter for a section of a currently encoding picture of a plurality of pictures to produce an updated quantization parameter when the current section is not the first section in a current line of sections of the currently encoding picture and a sum of absolute transform differences variation of the currently encoding picture is less than a first threshold, and an average sum of absolute transformed differences from a first line to the current line of sections of the currently encoding picture is less than or equal to a second threshold and the derived quantization parameter is less than a minimum quantization parameter for the currently encoding picture, wherein the value of the updated quantization parameter is equal to the value of the minimum quantization parameter, wherein the minimum quantization parameter is the minimum quantization parameter from a previous section incremented by one or an initial value of at least one wherein the minimum quantization parameter value is updated before encoding; and
   encoding the section using the updated quantization parameter to produce an encoded section.

2. The method of claim 1, wherein the currently encoding frame is a predicted frame.

3. The method of claim 1, wherein the section of the currently encoding picture is a macroblock.

4. The method of claim 1, further comprising, deriving the derived quantization parameter.

5. The method of claim 1, further comprising, receiving the derived quantization parameter.

6. The method of claim 1, further comprising transmitting the encoded section over a network.

7. The method of claim 1, further comprising, for a plurality of sections of the currently encoding picture, incrementing a derived quantization parameter for each section of the plurality of sections to produce a corresponding updated quantization parameter when the derived quantization parameter is less than a minimum quantization parameter for the currently encoding picture; and
   encoding each section of the plurality using the corresponding quantization parameter.

8. The method of claim 1, further comprising, for all unencoded sections of the currently encoding picture, incrementing a derived quantization parameter for each unencoded section to produce a corresponding updated quantization parameter when the derived quantization parameter is less than a minimum quantization parameter for the currently encoding picture; and encoding each unencoded section using the corresponding quantization parameter to produce an encoded picture.

9. The method of claim 1, further comprising, for all unencoded sections of the currently encoding picture, incrementing a derived quantization parameter for each unencoded section to produce a corresponding updated quantization parameter when the derived quantization parameter is less than a minimum quantization parameter for the currently encoding picture;

encoding each unencoded section using the corresponding quantization parameter to produce an encoded picture; and transmitting the encoded picture over a network.

10. The method of claim 1, further comprising generating the currently encoding picture.

11. The method of claim 1, further comprising generating the currently encoding picture using a video game program.

12. A system, comprising:
a processor module;
a memory coupled to the processor, wherein the memory contains executable instructions configured to implement a method upon execution, the method comprising:
determining a derived quantization parameter for a section of a currently encoding picture of a plurality of pictures to produce an updated quantization parameter when the current section is not the first section in a current line of sections of the currently encoding picture and a sum of absolute transform differences variation of the currently encoding picture is less than a first threshold, and an average sum of absolute transformed differences from a first line to the current line of sections of the currently encoding picture is less than or equal to a second threshold and the derived quantization parameter is less than a minimum quantization parameter for the currently encoding picture, wherein the value of the updated quantization parameter is equal to the value of the minimum quantization parameter, wherein the minimum quantization parameter is the minimum quantization parameter from a previous section incremented by one or an initial value of at least one wherein the minimum quantization parameter value is updated before encoding; and
encoding the section using the updated quantization parameter to produce an encoded section.

13. The system of claim 12, wherein the executable instructions are further configured to implement the following upon execution:
for a plurality of sections of the currently encoding picture, incrementing a derived quantization parameter for each section of the plurality of sections to produce a corresponding updated quantization parameter when the derived quantization parameter is less than a minimum quantization parameter for the currently encoding picture; and encoding each section of the plurality using the corresponding quantization parameter.

14. The system of claim 12, wherein the executable instructions are further configured to implement the following upon execution:
for all unencoded sections of the currently encoding picture, incrementing a derived quantization parameter for each unencoded section to produce a corresponding updated quantization parameter when the derived quantization parameter is less than a minimum quantization parameter for the currently encoding picture; and
encoding each unencoded section using the corresponding quantization parameter to produce an encoded picture.

15. The system of claim 12, wherein the executable instructions are further configured to implement the following upon execution:
for all unencoded sections of the currently encoding picture, incrementing a derived quantization parameter for each unencoded section to produce a corresponding updated quantization parameter when the derived quantization parameter is less than a minimum quantization parameter for the currently encoding picture;
encoding each unencoded section using the corresponding quantization parameter to produce an encoded picture; and
transmitting the encoded picture over a network.

16. The system of claim 12, wherein the processor module is configured to generate the currently encoding picture.

17. A non-transitory computer readable medium having embodied therein computer readable instructions configured, to implement a method, the method comprising:
determining a derived quantization parameter for a section of a currently encoding picture of a plurality of pictures to produce an updated quantization parameter when the current section is not the first section in a current line of sections of the currently encoding picture and a sum of absolute transform differences variation of the currently encoding picture is less than a first threshold, and an average sum of absolute transformed differences from a first line to the current line of sections of the currently encoding picture is less than or equal to a second threshold and the derived quantization parameter is less than a minimum quantization parameter for the currently encoding picture, wherein the value of the updated quantization parameter is equal to the value of the minimum quantization parameter, wherein the minimum quantization parameter is the minimum quantization parameter from a previous section incremented by one or an initial value of at least one wherein the minimum quantization parameter value is updated before encoding; and
encoding the section using the updated quantization parameter to produce an encoded section.

* * * * *